Sept. 22, 1942.  T. A. BOWERS  2,296,333
SEALING RING MEANS
Filed Aug. 16, 1941  2 Sheets-Sheet 1
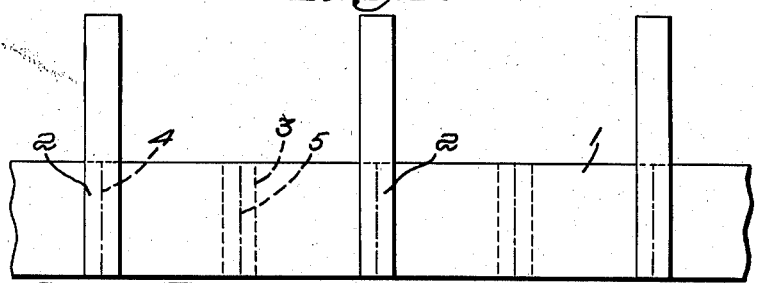
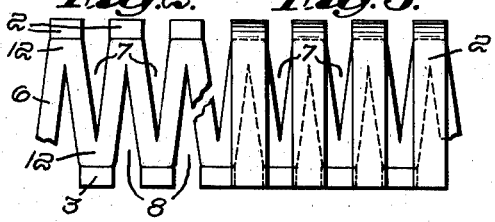
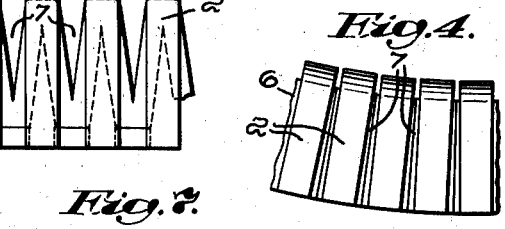
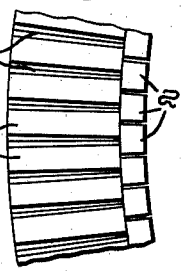
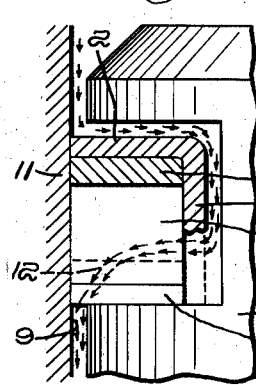
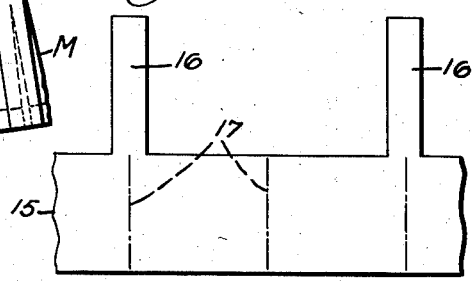
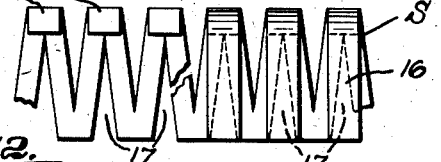
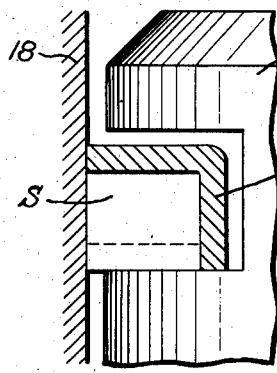
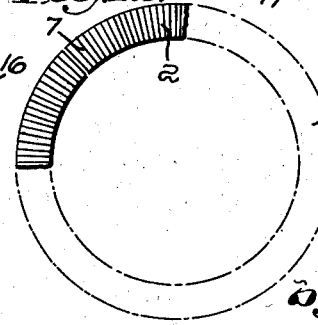

Sept. 22, 1942.  T. A. BOWERS  2,296,333
SEALING RING MEANS
Filed Aug. 16, 1941   2 Sheets-Sheet 2
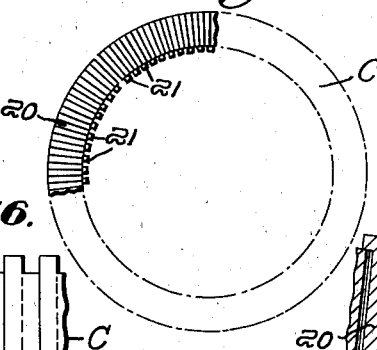
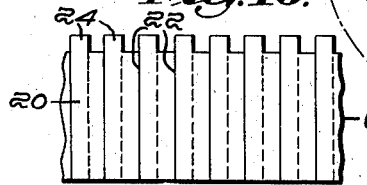
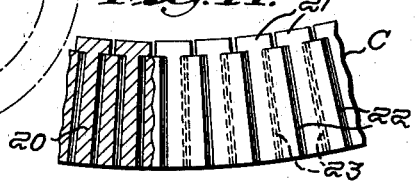
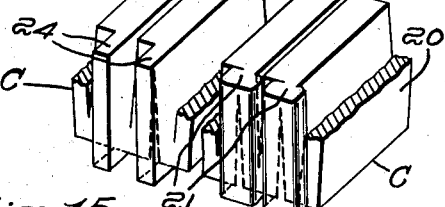
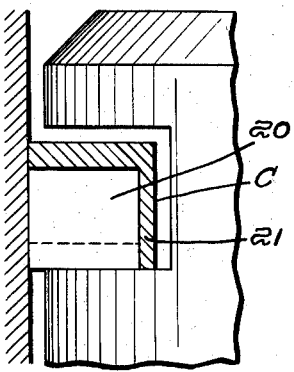
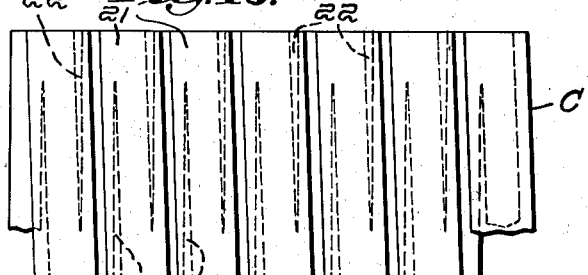
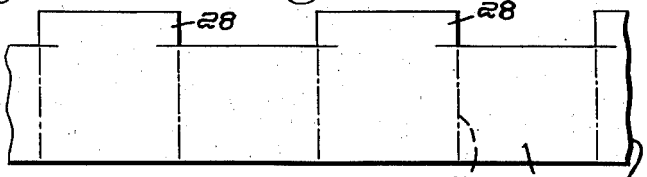
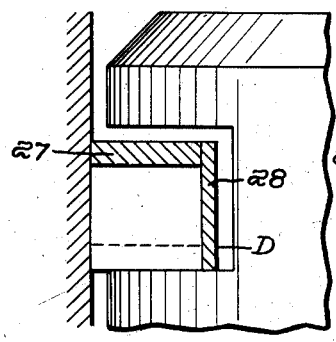
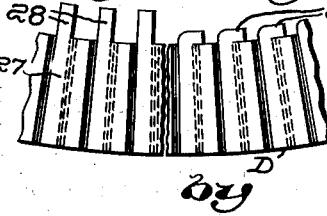
Inventor:
Thomas A. Bowers
by Munro H. Hamilton
Attorney Patented Sept. 22, 1942

2,296,333

UNITED STATES PATENT OFFICE 2,296,333

SEALING RING MEANS

Thomas A. Bowers, Mattapoisett, Mass., assignor to Power Research Corporation, Boston, Mass., a corporation of Massachusetts Application August 16, 1941, Serial No. 407,124

12 Claims. (Cl. 309—45)

This invention relates to piston rings and more especially to resilient piston rings having circumferentially movable portions which are connected to one another in spaced-apart relation to present annular rows of interstices.

An object of the invention is to improve piston rings having interstices and circumferentially movable portions, and to devise special sealing means with a view to closing the interstices at one or more sides of the ring. Another object of the invention is to provide improved wearing surfaces for fabricated piston rings. Another object of the invention is to improve methods of making piston rings from resilient sheet material. The invention also aims to provide a piston ring which is cheap, durable, easily installed, and efficient.

The nature of the invention and its objects will be more fully understood from the following description of the drawings and discussion relating thereto.

In the accompanying drawings:

Fig. 1 is a fragmentary plan view illustrating a step in a method of making a piston ring in accordance with the invention;

Figs. 2 and 3 are fragmentary elevational views illustrating other steps in the method referred to;

Fig. 4 is a fragmentary plan view of a finished ring;

Fig. 5 is a fragmentary bottom plan view of a finished ring;

Fig. 6 is a fragmentary cross sectional view illustrating the ring of the invention assembled in a piston and cylinder;

Fig. 7 is a fragmentary plan view of a modified piston ring;

Figs. 8, 9, 10 and 11 illustrate a modified ring and method of manufacture;

Fig. 12 is a plan view of a complete ring of the type shown in Figs. 1-6 inclusive;

Figs. 13-19 inclusive relate to another modification of piston ring; and

Figs. 20-25 inclusive illustrate still another modified piston ring and its construction.

In the manufacture of piston rings, it has been found that highly desirable flexibility and resiliency may be obtained from a piston ring body formed of a plurality of connected walls of resilient piston ring material occurring in slightly spaced-apart relation. One method of making such a ring structure consists in reversely folding a resilient strip of piston ring material upon itself and then bending a straight length of the reversely folded stock into a circular form. The circumferentially spaced-apart arrangement of the walls forms upper and lower annular rows of interstices which extend radially of the ring. The rows of interstices, extending radially of the ring, present minute passages which connect with the space between the cylinder wall and the piston. These passages, if of sufficiently large size, may allow undesirable leakage of gases through the ring.

In accordance with the invention, I provide mechanical means for closing or sealing one or both of the rows of interstices at the inner periphery of the ring, while permitting the walls of the piston ring to move circumferentially with respect to one another, in their usual manner, thus maintaining resiliency and flexibility. The closure means consists of a plurality of sealing members arranged in circumferentially spaced-apart relation along the inner periphery of the ring, and overlying the interstices between the walls. The sealing members are adapted to be associated with other sections of the ring in various ways, as will be hereinafter described.

Referring more in detail to the drawings, Fig. 12 illustrates a piston ring R having a plurality of circumferentially compacted walls which are covered by sealing members disposed at the inner periphery of the ring.

As illustrative of one method of forming the ring R, a strip of resilient piston ring material, as for example, steel ribbon, is provided with projecting sealing members 2 secured transversely along one side of the strip, and members 3 secured along an opposite side thereof (Fig. 1). A preferred method of securing the sealing members consists in welding although other means of fastening may be resorted to.

The strip 1 is reversely folded along lines of folding 4 and 5 and bent into a circular body in which the portions of strip 1 occurring between the points of folding constitute axially disposed walls 6 secured together at the top and bottom sides of the ring by connecting portions 12. The sealing members 2 are mounted above the connecting portions 12 at the upper side of the ring, and extend radially inward therefrom. The sealing members 3 occur just below the connecting portions 12 at the under side of the ring.

The walls are circumferentially spaced apart to provide an upper annular row of interstices 7 and a lower annular row of interstices 8. These interstices permit the walls 6 to be moved toward one another circumferentially of the ring, and the resilient character of the metal or material of which they are composed causes them to tend to revert back to a relatively greater spaced-apart position, thus imparting resiliency and wall pressure to the ring, when this member is held in a compacted position in a cylinder with its ends in abutting relation. The size of the interstices or the width of the spaces between the walls, at their points of greatest separation, may vary from as low as four-thousandths of an inch to one thirty-second of an inch or more.

The radially extending ends of the sealing members 2 are bent downwardly into overlapping relation with the inner periphery of the ring, and are of a size adapted to substantially overlie the entire axial length of the interstices 7 to close these openings to passage of gas radially through the ring.

The circumferential width of the sealing elements 2 does not exceed the circumferential width of the connecting portions 12, which permits the walls 6 to be moved circumferentially together without interference by the sealing members. A circumferential width of one thirty-second of an inch is for example suitable for the sealing members 2. The sealing members 3 occurring at the under side of the ring are of the same circumferential width as the members 2 and serve to balance the piston ring and to provide wearing surfaces at the under side of the ring which are of the same weight and durability as those at the under side of the ring. If desired, the sealing member 3 may also be formed with projecting ends which can be utilized to seal one or the other of the rows of interstices.

An important feature of the invention is the use of the bent-over strips or sealing members at the inner periphery of the ring, to substantially overlie and seal the lower interstices of the ring structure described. These lower interstices, when the ring is seated in a piston groove, normally connect the space in back of the ring with the space 9 between the piston 10 and the cylinder 11, permitting passage of gases in the directions indicated by the arrows, as shown in Fig. 6. The sealing members 2 overlie this passage and under pressure of combustion gases are tightly forced against the edges of walls, sealing the ring at the lower side noted.

Another important feature of the invention is the use of the attached segments or strips of piston ring material at the top and bottom sides of a flexible piston ring, to form substantially flat sealing surfaces and reinforced wearing surfaces. Heretofore it has been necessary in the case of reversely folded ribbon rings to flatten the bent portions of the material in order to secure relatively square crowns or tops which would fit snugly against the side of a piston ring groove and form a seal. Such a forming operation tends to thin the connecting portions, thus weakening them unless they are thickened by special treatment. The attached segments of the ring of the invention provide flat surfaces and added thickness of material all along the top and bottom sides of the ring without any special forming operation being necessary. This adds greatly to the life and durability of the ring, and in addition greatly decreases the cost of manufacture and simplifies methods of making such rings.

In connection with the provision of sealing members at one side of an open piston ring structure, a number of changes or modifications may be resorted to. For example, a ring of the reversely folded strip type described, having sealing elements or strips attached along connecting portions thereof, may be incorporated into an annular body in which the lines of bending of the reversely folded strip occur axially of the ring, instead of radially, as was the case of the ring of Figs. 1–6 inclusive.

Fig. 7 illustrates in plan view a ring M formed in this manner. The free edges of the strip constitute upper and lower sides of the ring, and sealing members 13 overlie interstices 14 at the upper side of the ring.

I may also desire to utilize sealing members which are integral with the reversely folded strip. In Figs. 8–11 inclusive, I have illustrated a process in which a strip 15 is punched to provide projecting sealing portions 16 and the strip is folded along lines of folding 17 to provide a ring S. The sealing portions 16 are bent downwardly in the already described manner, to seal the interstices 17. This ring is also illustrative of a structure having only one row of sealing members at the upper side of the ring. Fig. 11 illustrates the ring S mounted in a cylinder 18 and piston 19.

Another type of sealing member for closing ring interstices is disclosed in Figs. 13–19 inclusive. A piston ring C, having alternately connected walls 20, is provided with circumferentially spaced-apart sealing portions 21. The sealing portions 21 are integral with the walls 20 and extend circumferentially along the inner periphery of the ring, into an overlapping relation with respect to the interstices 22 and 23. Figs. 16, 17 and 18 illustrate one method of forming such a ring, in which the walls 20 formed with inwardly projecting ends 24 are compacted against one another and the projecting ends are thereafter flattened out in some suitable manner, as by hammering, to assume the extended position shown.

Other methods such as squeezing the ring of Fig. 16 to thin the walls 20 circumferentially, while maintaining the circumferential thickness of the projecting ends 24 unchanged, may also be resorted to. The sealing portions 21 are of the same axial height as the ring and furnish additional sealing surfaces for the ring at its top and bottom sides, as well as sealing both rows of interstices. Considerable modification of the sealing portions 21 may be resorted to, as by having them extend over only one row of interstices, or by extending to a point below the top surface of the ring, or in other ways.

In Figs. 20–25 inclusive, I have illustrated still another form of sealing portions or sealing members incorporated with a plurality of axially disposed and alternately connected walls of piston ring material forming a ring D.

In making the ring D, a strip of resilient sheet metal 26 is punched to provide wall portions 27 and sealing portions 28, occurring along one edge of the strip of material. The punched stock is reversely bent along lines of folding 29, which provides for the sealing portions 28 becoming arranged in a substantially axially extending position, as shown in Fig. 21. These sealing portions 28 are thereafter bent over upon the inner edges of the wall portions 27 (Figs. 23–24), and in this position overlie the interstices or openings 30 occurring between the wall portions 27, thus providing a sealing means at the inner periphery of the ring of the same general type already noted in connection with the above described figures.

It may be found desirable to partially sever the sealing portions 28 along the edge of the strip to allow the ring to flex more readily, and it may also be desired to employ sealing portions which are large enough to overlie a plurality of interstices.

It will be seen that the rings of the invention provide a simple, cheap, and durable means of closing one or more rows of interstices occurring in a fabricated piston ring. This sealing action is obtained without modifying or interfering with the relative circumferential movement of each of the wall portions in the ring. In addition, the structure may be utilized to provide strengthened wearing surfaces, and to facilitate the formation of square crown portions in a ring of the reversely folded type. As a result, the time and cost of making fabricated piston rings, made up of a plurality of connected walls of piston ring material, may be greatly decreased, and other advantages secured.

While I have shown a preferred embodiment of my invention, it should be understood that various changes and modifications may be resorted to, in keeping with the spirit of the invention as defined by the appended claims.

I claim:

1. A piston ring comprising a plurality of walls, connecting portions for the walls, said walls spaced apart to provide annular rows of V-shaped interstices, a plurality of sealing portions arranged at one side of the ring, said sealing portions being integral with said walls and extending into overlapping relation with respect to the interstices of at least one of the said annular rows.

2. A piston ring comprising a plurality of walls connected together at opposite sides of the ring, the free edges of the walls being spaced apart at the inner and outer peripheries of the ring, to provide V-shaped interstices, sealing portions connected to edges of the walls at the inner periphery of the ring, said sealing portions being of a greater circumferential width than the said interstices.

3. A piston ring comprising a plurality of axially extending walls, connecting portions for the walls, said walls being spaced apart to provide upper and lower annular rows of interstices opening at the inner and outer peripheries of the ring, a plurality of sealing elements integral with inner peripheral edges of the ring, said sealing elements occurring in overlapping sealed relation with respect to the openings included by said lower annular rows of interstices.

4. A piston ring comprising a plurality of walls of piston ring material, connecting portions for the walls occurring at opposite sides of the ring, said walls being circumferentially spaced apart to provide upper and lower annular rows of interstices which are open at the inner and outer peripheries of the ring, radially extending sealing portions mounted on connecting portions at one side of the ring, the sealing members having bent extremities lying against the inner periphery of the ring and overlapping said interstices.

5. A piston ring comprising a plurality of walls of piston ring material, connecting portions for the walls occurring at opposite sides of the ring, said walls being circumferentially spaced apart to provide upper and lower annular rows of interstices which are open at the inner and outer peripheries of the ring, radially extending sealing portions mounted on connecting portions at one side of the ring, said sealing members having bent extremities lying against the inner periphery of the ring, said bent-over extremities being of a circumferential width greater than the normal circumferential width of the said interstices.

6. A piston ring comprising a plurality of walls of piston ring material, radially extending connecting portions for the walls at opposite sides of the ring, said walls being circumferentially spaced apart to present upper and lower annular rows of interstices, segments of piston ring material mounted on the connecting portions, said segments having folded extremities which extend axially into overlapping relation with the said lower row of interstices at the inner periphery of the ring.

7. A piston ring comprising a plurality of walls of piston ring material, radially extending connecting portions for the walls at opposite sides of the ring, said walls being spaced apart to present upper and lower annular rows of interstices which open at the inner and outer peripheries of the ring, said connecting portions having projecting ends thereof bent over into overlapping relation with respect to the edges of the walls at the inner periphery of the ring, said ends adapted to close the said lower row of interstices.

8. A piston ring comprising a plurality of walls of piston ring material, connecting portions for the walls at opposite sides of the ring, said walls being spaced apart to provide upper and lower annular rows of interstices which open at the inner and outer peripheries of the ring, a plurality of circumferentially spaced-apart strips disposed at the inner periphery of the ring in overlapping sealed relation with respect to the said lower row of interstices, said strips being a continuation of the said connecting portions of the ring.

9. A piston ring comprising a plurality of walls of piston ring material, connecting portions for the walls, said walls being spaced apart to provide upper and lower annular rows of interstices, said walls having inner peripheral ends of increased circumferential thickness, said peripheral ends adapted to overlie openings between the walls in at least one of the rows of interstices.

10. A piston ring comprising a plurality of walls of piston ring material, connecting portions for the walls, said walls being spaced apart to present upper and lower annular rows of interstices which are open at the inner and outer peripheries of the ring, said walls having ends thereof bent over along axially extending lines of bending, said bent-over ends adapted to overlap the said interstices at the inner periphery of the ring.

11. A piston ring comprising a plurality of walls of piston ring material connected together at opposite sides of the ring, said walls being spaced apart to provide upper and lower annular rows of interstices which open at the inner and outer peripheries of the ring, said walls including inner flap portions bent over along axial lines of bending to overlie interstices at the inner periphery of the ring.

12. A piston ring comprising a plurality of walls of piston ring material connected together at opposite sides of the ring, said walls being spaced apart to provide upper and lower annular rows of interstices, said walls including circumferentially spaced-apart flap portions adapted to overlie the interstices at one side of the ring.

THOMAS A. BOWERS.